March 24, 1942. O. O. RIESER 2,277,257

OVERFILL-PREVENTING DEVICE FOR STORAGE BATTERIES

Filed Aug. 7, 1939

INVENTOR.
OLIVER O. RIESER.
BY Allen & Allen
ATTORNEYS.

Patented Mar. 24, 1942

2,277,257

UNITED STATES PATENT OFFICE 2,277,257

OVERFILL-PREVENTING DEVICE FOR STORAGE BATTERIES

Oliver O. Rieser, Oak Park, Ill., assignor to The Richardson Company, Lockland, Ohio, a corporation of Ohio Application August 7, 1939, Serial No. 288,748

2 Claims. (Cl. 136—178)

My invention is addressed to the provision of devices for storage batteries to prevent overfilling thereof with liquid as is likely to occur when adding water to the electrolyte. By the prevention of overfilling, an adequate gas collection space above the top of the electrolyte within the cell cover is insured. An object of my invention is to provide a structure such that when the filler cap is removed from the filler opening of the cell cover of a storage battery, a tube through which the battery must be filled extends downwardly to the desired electrolyte level. Water or other liquid may be introduced into the cell through this tube and will fill the cell to the level of the lower end of the tube. As soon as the electrolyte reaches the lower end of the tube it cannot rise further within the cell cover, but rapidly rises within the tube giving to the operator notice that he is overfilling the cell. When the filler cap is in place, however, it is necessary that the space within the cell cover above the electrolyte level be vented to the outer air above the level of the end of the tube.

It is my object to accomplish these functions in a control device which is simple and inexpensive though positive in operation.

It is my object to provide a structure which can be installed in the ordinary cell cover without change in the configuration or manufacture thereof.

It is further my object to provide a structure which may be installed in a cell cover in an assembled storage battery and without disassembly thereof, which requires no change in the cell cover per se for installation or operation, and which may be readily removed and replaced if damaged.

These and other objects of my invention which will be set forth hereinafter or will be apparent to one skilled in the art upon reading this specification, I accomplish by that certain construction and arrangement of parts of which I shall now describe an exemplary embodiment. Reference is made to the drawing wherein.

Briefly in the practice of my invention, I provide in the ordinary filling opening a downwardly extending slidable tubular member. The filler opening itself has an annular inturned flange about its lower end, and the member just referred to has an outturned annular flange about its upper end. Between the two flanges I place a springy or resilient means acting to urge the tube upwardly. The tube itself is perforated intermediate its ends with one or more holes in such position that when the tube is in its upper position, these holes are covered by or at least do not extend lower than the bottom of the filler opening. When the member is in this position, however, the lower end of it extends down to the desired maximum electrolyte level. When the filler cap is in place it depresses the tube so as to bring the perforations through the two side walls into communication with the space beneath the cell cover, thereby venting this space as set forth above.

Figure 1:
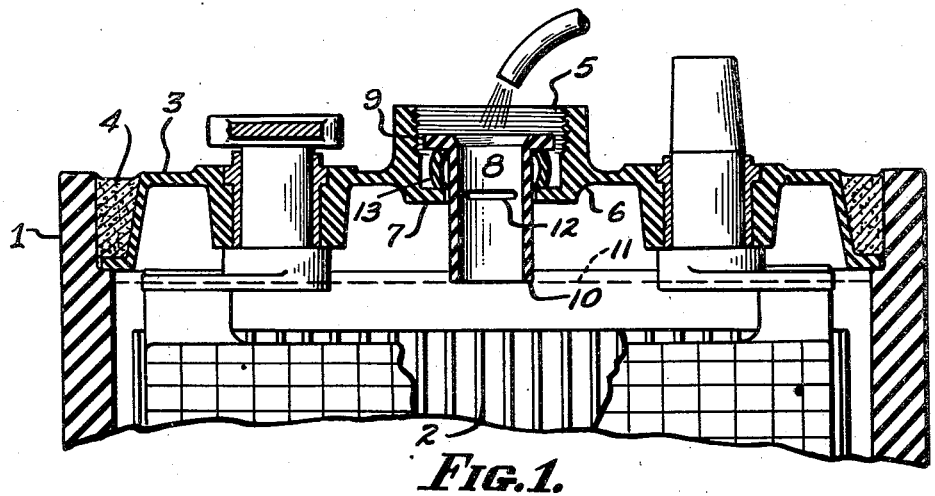
Figure 1 is a cross sectional view through a cell of an electric storage battery equipped with my invention, the filler cap having been removed.

Referring to Fig. 1, I indicates a storage battery box containing the usual plate assembly 2, within a cell thereof. The cell is closed by the usual cell cover 3 held in place by sealing compound 4. The cell cover is preferably of ordinary type being hollow within, as shown. It is provided with a filler opening indicated at 5. This opening is formed in downwardly and/or upwardly extending portions of the body of the cell cover, defining a well; and the interior of the opening is usually threaded as shown, though it may be provided with other means for fastening a filler cap in place. The walls 6 defining the filler opening terminate downwardly in an inturned flange 7 in the usual construction. This flange is perforated with a central opening through which I pass a tube-shaped body 8. This body has on its upper end an outturned annular flange 9. The tube when in the position shown in Fig. 1 provides a filling aperture for the cell. The lower end 10 of the tube extends downwardly to a desired maximum electrolyte level 11. The tube has one or more perforations 12 through the side walls thereof. These perforations may be in the form of rounded holes but are also conveniently made in the form of horizontal slots such as could be made in the walls of the tube by milling. The perforation or perforations 12 are so located in the walls of the tube that when the tube is in the position shown in Fig. 1, the perforations will not lie below the bottom of the flange portion 7 of the filler opening. In order to maintain the tube 8 in the position shown, a resilient member 13 is interposed between the flange 9 of the tube and the flange 7 of the filler opening. The tube may be of metal capable of resisting the attack of the storage battery electrolyte, or it may be and preferably is made of some insulative substance such as hard rubber or other moulded compound.

Figure 4:
Fig. 4 is a perspective view of a resilient member which I may employ.

The resilient member 13 may, if desired, be formed in spring shape from a non-corrosive metal or a metal coated with non-corrosive substance or some other non-corrosive material of sufficient resiliency; but I have found it adequate for my purpose to employ an annular shaped member such as that shown in Fig. 4, made of live, resilient rubber. I have found that such a member has sufficient life in service and also is readily and inexpensively replaced if for any reason it should become damaged or lose its resiliency.

Figure 2:
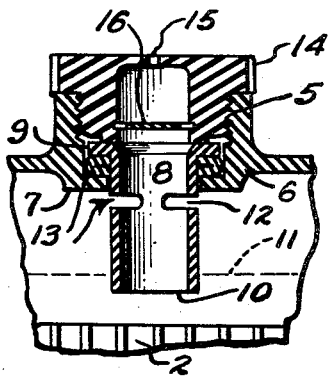
Fig. 2 is a partial sectional view with the filler cap in place, showing the action of the venting arrangement.
Figure 3:
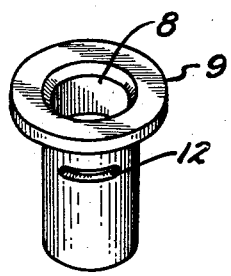
Fig. 3 is a perspective view of a fitting which I employ.

A tight fit of the tube 8 in the opening in the annular flange 7 is not necessary. The parts just described will normally be wet with electrolyte and this will serve to effect a seal. It will be clear from a consideration of Fig. 1 that if the cell is filled through the tube 8 it cannot be filled to a level above the level 11. If more than the necessary quantity of electrolyte or water is added, the air trapped beneath the cell cover will force the electrolyte to rise rapidly in the tube 8 and will give warning to the operator that the filling operation is finished. Nevertheless when the filler cap 14 is threaded or otherwise fastened in place it will be noted in Fig. 2 that the lower end of it engages the top of the tube 8 and depresses the tube so that the perforation or perforations 12 become uncovered within the cell cover. Thus as indicated by the small arrow the gas collection space within the cell cover is vented to the atmosphere through the filler cap. The filler cap has, of course, the usual gas vent opening 15 and preferably is provided with the usual splash washer arrangement 16.

It will be clear that my construction in its preferred form is extremely simple and inexpensive, and further that it is readily installed and replaced without disassembly of the storage battery. The tubular member 8 may be withdrawn and the resilient member 13 can be withdrawn and replaced by simple upward movements. When in use, gravity maintains the parts; but my preferred construction is such that the parts cannot become disarranged or displaced as will be evident.

Modifications may be made in my invention without departing from the spirit of it.

Having thus described my invention, what I claim as new and desire to secure by Letters Patent, is:

1. A cell cover having a filler well terminating downwardly in an inwardly turned flange having a central perforation, a rigid tubular member slidable in said perforation and terminating upwardly in an outturned flange, resilient means supporting said tubular member and positioned between said flanges, the wall of said tubular member having an aperture therein, a vented filler cap for said filler opening and having a portion adapted to engage said tubular member and axially move it in the said perforation until said aperture is below said inwardly turned flange when said cap is seated, said aperture being closed by said flange when said cap is unseated.

2. A cell cover having a filler well terminating downwardly in an inwardly turned flange having a central perforation, a rigid tubular member slidable in said perforation and terminating upwardly in an outturned flange, resilient means supporting said tubular member and positioned between said flanges, the wall of said tubular member having an aperture therein, a vented filler cap for said filler opening and having a portion adapted to engage said tubular member and axially move it in the said perforation until said aperture is below said inwardly turned flange when said cap is seated, said aperture being closed by said flange when said cap is unseated, said resilient member comprising an annulus of rubber located within said filler well and interposed between said flanges.

OLIVER O. RIESER.